Sept. 20, 1960 — C. F. BERTSCHINGER — 2,953,274

TAPE DISPENSER

Filed Oct. 13, 1958 — 2 Sheets-Sheet 1

INVENTOR.
CHARLES F. BERTSCHINGER
BY Ervin B. Steinberg
AGENT.

Sept. 20, 1960 C. F. BERTSCHINGER 2,953,274
TAPE DISPENSER

Filed Oct. 13, 1958 2 Sheets-Sheet 2

INVENTOR.
CHARLES F. BERTSCHINGER
BY
Ervin B. Steinberg
AGENT.

United States Patent Office 2,953,274
Patented Sept. 20, 1960

2,953,274
TAPE DISPENSER

Charles F. Bertschinger, Leeds, Mass., assignor to Chart-Pak, Incorporated, Leeds, Mass., a corporation of Connecticut Filed Oct. 13, 1958, Ser. No. 766,750

10 Claims. (Cl. 216—20)

This invention is related to dispensers for dispensing pressure sensitive tape and has particular reference to a dispenser which is adapted to dispense in unison a plurality of individual tapes in predetermined alignment onto a common surface.

Many designs of tape dispensers are known in the art which retain a single roll of pressure adhesive tape and dispense tape therefrom onto a surface. In U.S. patent, 2,763,393, issued September 18, 1956 to Earle F. Gill, et al., there is described for instance, a tape dispenser for pressure sensitive tape which is adapted to dispense tape for the purpose of creating statistical charts, graphs, and other pictorial illustrations. Graphs of this type are made by affixing tape $\frac{1}{32}$, $\frac{1}{16}$ or $\frac{1}{8}$ inch wide imprinted with designs, various colors, and other pictorial representations in an exact and precise manner onto a ruled surface, thus eliminating tedious drafting work and enhancing in general, the appearance of the final product.

The instant tape dispenser has been designed for a similar purpose but serves to dispense simultaneously a plurality of individual tapes so as to create more versatile charts and graphs and to accomplish in one single operation a job which otherwise would require the consecutive laying of individual tapes. Moreover, it will be possible not only to use tapes of differing width but also to space tapes very exactly from one another so as to furnish very distinctive and precise graphs in very few operations. A tape dispenser of this type will be useful particularly in the field of cartography where many multi-colored lines must be affixed onto a single map. Other uses for this type of device will reside in the creating of maps showing airline routes, air spaces, geographic boundaries and in producing many other charts and maps of a similar nature.

One of the objects of this invention therefore is the provision of a tape dispenser for dispensing in unison a plurality of individual tapes.

Another object of this invention is the provision of a tape dispenser which is equipped with adjustable guide means for confining therebetween tapes along their width immediately before the tapes are applied to a surface.

Another object of this invention is the provision of a tape dispenser which supports a plurality of individual rolls of tape and wherein the tapes are applied in unison to a surface at a predetermined spacing between one another.

A further object of this invention is the provision of a tape dispenser for dispensing in unison a plurality of individual tapes wherein adjustable guide means are provided for retaining therebetween the individual tapes.

A still further object of this invention is the provision of a dispenser for dispensing in unison a plurality of individual tapes which may be of differing width.

One feature of the dispenser for dispensing in unison a plurality of individual tapes comprises means for supporting a plurality of individual rolls of tape, each roll carrying adhesive tape which is to be affixed to a surface by pressure contact therewith. Adjustable guide means are disposed on the dispenser for confining therebetween the plurality of tapes along their width immediately before the tapes come into contact with the surface to which they become affixed.

For a better understanding of the present invention, together with other and further objects and features thereof, reference is made to the following description taken in conjunction with the accompanying drawings in which.

Figure 1:
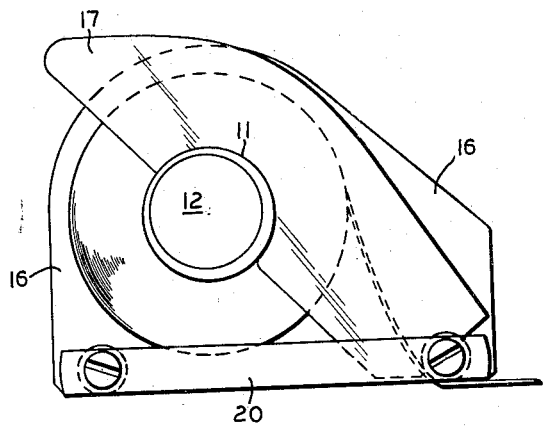
Figure 1 is a side elevational view of a typical embodiment of the tape dispenser.
Figure 2:
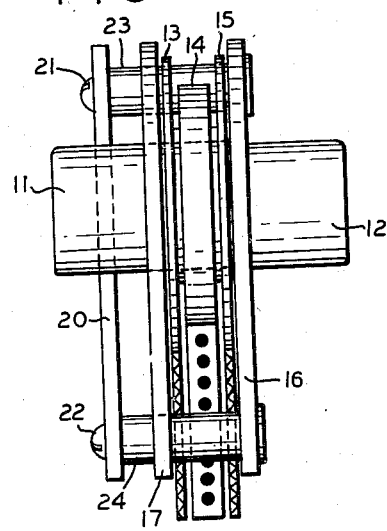
Figure 2 is a top view of the tape dispenser shown in Figure 1.
Figure 3:
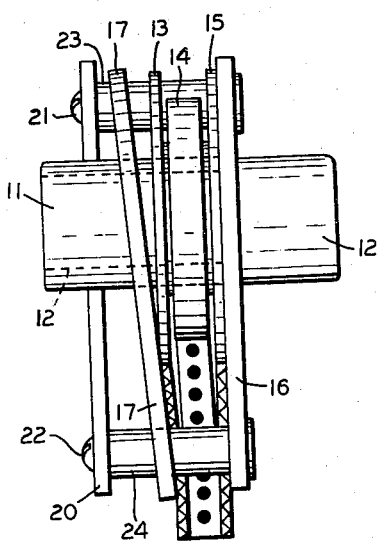
Figure 3 is another top view of the tape dispenser shown in Figures 1 and 2 with one of the side plates designed as adjustable guide means and being adjusted for a certain tape width.
Figure 4:
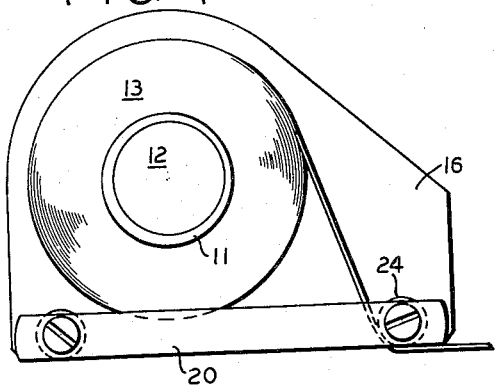
Figure 4 is an elevational side view, same as Figure 1, with the adjustable side plate removed.

The term "lateral alignment" as used in the specification and claims shall be interpreted as denoting that the plurality of tapes are laterally aligned with respect to one another and shall include the condition when the inner edges of two neighboring tapes are adjacent, adjoining, partially overlapping, or separated by a gap.

Referring now to Figures 1 through 5, numeral 11 identifies an eccentric bushing which turns on stationary shaft 12 and which supports on its periphery three rolls of tape, identified by numerals 13, 14, and 15 respectively. It may be observed that the tapes may not necessarily be of the same width but that tapes 13 and 15 may be $\frac{1}{32}$ inch wide while tape 14 may be $\frac{1}{8}$ inch wide. These tapes are of the pressure sensitive type, either transparent or opaque, and may be imprinted with individual colors, designs, patterns, symbols, etc.

The rolls of tape are confined laterally between a stationary side plate 16 and a removable, smaller side plate 17 (shown more clearly in Figure 5), both plates being made for instance of transparent plastic material so as to facilitate inspection of the tape and application of the tape onto a surface without creating shadows. A bar 20 is mounted in spaced relationship parallel to stationary side plate 16 and is held in place by means of a set of fastening means 21 and 22, each of which is covered by a tubular bushing 23 and 24 respectively.

Removable side plate 17 is designed so that semi-circular recess 26 engages bushing 24 and another substantially semicircular recess 27 engages eccentric bushing 11 with a snug fit. Bushing 11 disposed about stationary shaft 12 terminates at the inner side wall of plate 16. For the length of bushing 11, stationary shaft 12 is of reduced diameter to accommodate the bushing but assumes substantially the same diameter as the bushing for the remaining length.

Figure 5:
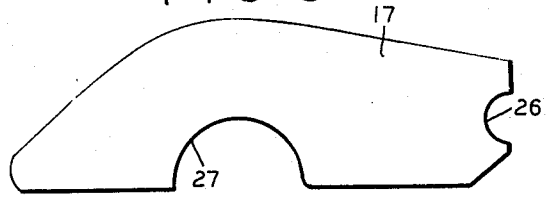
Figure 5 is a view of the adjustable side plate when removed from the dispenser.

It should be observed that the rolls of tape, numerals 13, 14, and 15 are retained loosely between the side plates 16 and 17. When removable side plate 17 (Figure 5) is placed on the dispenser in such a manner that recess 26 partially surrounds bushing 24 and recess 27 partially surrounds eccentric bushing 11, the individual rolls of tape are held in place. Side plate 17 then may be locked in place by turning eccentric bushing 11 by about one half turn thereby urging the plate into a forward motion which causes recess 26 to be forced into intimate contact with bushing 24 and eccentric bushing 11 to exert locking pressure against the right side of the recess 27 (Figure 5). By virtue of this clamping pressure arrangement, removable side plate 17 may be set at any angle with respect to stationary plate 16, as illustrated for instance in Figure 3 wherein the opening at the exit end of the tape dispenser is of smaller dimension than the combined width of the three tapes. Obviously, the opening may be set to equal the width of the plurality of tapes.

Figure 10:
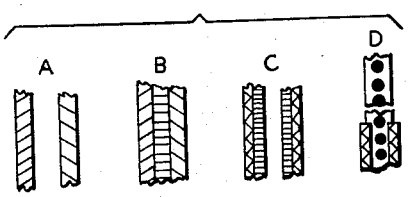
Figure 10 shows typical examples of patterns which may be achieved by the use of the tape dispenser designs described in the following specification.

As the tapes are unwound from their respective rolls, they are fed in lateral alignment about the underside of lateral spacing bushing 24 which is used to press the tapes onto the surface to which they are becoming affixed. Simultaneously however, side plates 16 and 17 in proximity to bushing 24 form an opening through which the combined tapes must pass just before they are pressed into contact with the surface. When this opening is adjusted so that it equals the width of the combined tapes, a pattern as shown in Figure 10B is achieved. When the opening however, is smaller the outer tapes will overlap the inner tape as shown in Figure 10D. In this manner there is achieved simultaneous application of a plurality of tapes and the combination of a center tape and "shroud lines."

Figure 6:
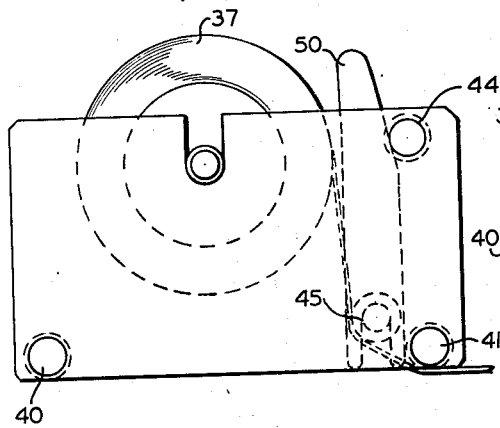
Figure 6 is a side view in elevation of another embodiment of the tape dispenser.

Figure 6 illustrates another design for a tape dispenser of this type which embodies as its main components a set of spaced side plates 31 and 32, a spindle 33 retained therebetween, and a plurality of rolls of tape 35, 36 and 37 disposed on the spindle. The side plates are secured to one another by two lateral bushings 40 and 41, bushing 41 serving as pressure means for effecting contact between the tapes and the surface to which they become affixed.

Two further lateral bushings 44 and 45 are contained between the side plates, each bushing carrying about its circumference a plurality of spaced annular grooves.

A plurality of elongated clips 50 are used to cooperate with bushings 44 and 45 in such a manner that the bifurcated lower end of each removable clip 50 fits into one of the grooves of bushing 44 and that the upper end of clip 50 engages a similar groove in bushing 44. These removable clips may be made of spring steel so that the upper end of the clip may be slightly bent and misaligned with respect to the lower groove whereby the clip becomes locked in place.

By providing a set of clips, the opening through which the tapes are fed immediately before they come into contact with pressure means 41 may be adjusted, thus obtaining substantially the same result as that shown in connection with the embodiment per Figures 1 through 5. Moreover, the tapes may be fed singly or in a plurality through a predetermined opening to obtain the pattern shown in Figures 10A or 10C. It will be advantageous to arrange the grooves in an incremental pattern which corresponds to the same pattern used for the tape width.

Figure 7:
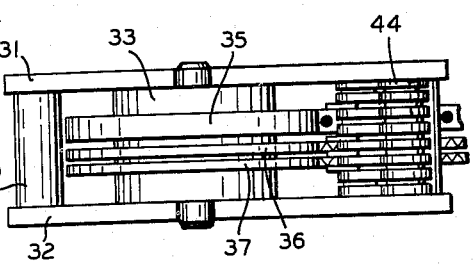
Figure 7 is a top view of Figure 6.
Figure 8:
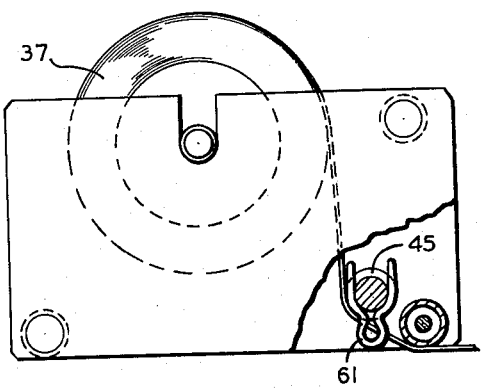
Figure 8 is an elevational side view of still another embodiment of the tape dispenser design.
Figure 9:
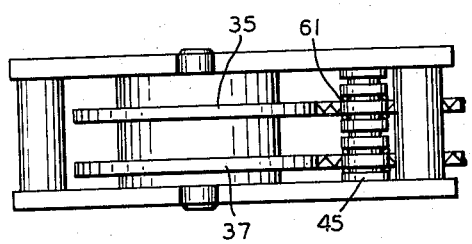
Figure 9 is a top view of Figure 8.

Figures 8 and 9 show still a further design for confining therebetween tapes along their width. In Figures 8 and 9 bushing 45 is of similar construction as described in Figures 6 and 7, but each annular groove is adapted to be engaged by a small bifurcated wire clip. When using a plurality of clips 61 the tapes either individually or as a plurality may be guided through a predetermined opening. It will be apparent that the number of designs and patterns will be governed only by the differing width of the tapes, the number of tapes, the spacing of the tapes and the lateral sequence of the tapes. It may be noted that it has been possible to dispense in unison more than a dozen individual tapes, each 1/16 inch wide, from a single dispenser as described heretofore.

It will be appreciated by those skilled in the art that the tape dispenser designs described offer greater convenience and speed for creating maps and charts. The variety of designs which may be produced is practically unlimited since there is not only the possibility of varying the individual tapes, the order of the tapes, but also the spacing between one or more tapes or the combined width of a plurality of individual tapes. The instant design therefore, provides a new, novel and most useful tool in the art of cartography and statistical displays.

While there have been described certain embodiments of the present invention it will be apparent to those skilled in the art that various other changes and modifications may be made therein without deviating from the principle and intent of this invention which should be limited only by the scope of the appended claims.

What is claimed is:

1. A tape dispenser for dispensing in unison a plurality of individual pressure sensitive tapes comprising: means for supporting a plurality of individual rolls of tape, each roll carrying adhesive tape which is to be affixed to a surface by pressure contact therewith, means integral with said dispenser for pressing said plurality of tapes in unison and in lateral alignment onto the surface as the tapes are unwound from their respective rolls, and adjustable guide means disposed on said dispenser for confining therebetween the tapes along their width immediately before the tapes come into contact with the surface to which they are adhesively affixed.

2. A tape dispenser for dispensing in unison a plurality of individual pressure sensitive tapes comprising: means for supporting a plurality of individual rolls of tape, a set of spaced side plates retaining said supporting means therebetween, said side plates being elongated in one direction to form an opening at which the plurality of tapes emerge in unison and in lateral alignment when being dispensed and affixed to a common surface, the plates confining the plurality of tapes therebetween and the width of the opening at which the plurality of tapes emerge being adjustable, and means integral with the dispenser disposed in close proximity to said opening serving as pressure means for effecting pressure contact between said tapes and said surface.

3. A tape dispenser for dispensing in unison a plurality of individual pressure sensitive adhesive tapes comprising: means for supporting a plurality of individual rolls of tape, each roll carrying adhesive tape which is to be affixed to a surface by pressure contact therewith, means integral with said dispenser for pressing said plurality of tapes in unison and in lateral alignment onto the surface as the tapes are unwound from their respective rolls and emerge from the dispenser, adjustable guide means disposed on said dispenser for confining therebetween the tapes along their width immediately before the tapes come in contact with the surface to which they are affixed, and said guide means comprising a transverse bar and adjustable spacing means engaging the bar.

4. A tape dispenser for dispensing in unison a plurality of individual tapes onto a common surface comprising: means for supporting a plurality of individual rolls of tape, each roll carrying adhesive tape which is to be affixed to said surface by pressure contact therewith, means disposed on said dispenser for pressing said plurality of tapes onto said surface as the tapes are unwound from their respective rolls, emerge from said dispenser and come into contact with said surface, adjustable guide means disposed on said dispenser for confining therebetween the tapes along their width immediately before the tapes come into contact with the surface, said guide means comprising a transverse bar having a plurality of spaced recesses and removable clips adapted to engage said recesses.

5. A tape dispenser as set forth in claim 4 wherein said transverse bar has a plurality of equally spaced grooves.

6. A tape dispenser for dispensing in unison a plurality of individual tapes comprising: means for supporting a plurality of individual rolls of tape, each roll carrying adhesive tape which is to be affixed to a surface by pressure contact therewith, means disposed on said dispenser for pressing said plurality of tapes in unison onto the surface as the tapes are unwound from their respective rolls, and adjustable means disposed on said dispenser for selectively spacing said tapes laterally from one another immediately before the tapes come into contact with the surface to which they become affixed.

7. A tape dispenser for dispensing in unison a plurality of individual pressure sensitive adhesive tapes comprising: means supporting a plurality of individual rolls of adhesive tape, a pair of spaced side plates retaining said tape supporting means therebetween, said side plates being elongated in one direction to form a single opening through which the plurality of tapes emerge in unison and in lateral alignment when being dispensed and affixed to a surface, means for adjustably setting one of the side plates with respect to the opposite side plate to adjust the width of the opening through which the plurality of tapes emerge, and means integral with the dispenser disposed in close proximity to the opening serving as pressure means for effecting pressure contact between said tapes and the surface as the tapes emerge through the opening.

8. A tape dispenser for dispensing in unison a plurality of individual pressure sensitive adhesive tapes comprising: means supporting a plurality of individual rolls of adhesive tape, a pair of spaced side plates retaining said tape supporting means therebetween, said side plates being elongated in one direction to form a single opening at which the plurality of tapes emerge in unison and in lateral alignment when being dispensed and affixed to a surface, means for adjustably tilting one of the side plates with respect to the opposite side plate to adjust the width of the opening at which the plurality of tapes emerge, and pressure means integral with the dispenser disposed in close proximity to the opening for effecting pressure contact between said tapes and the surface as the tapes emerge at the opening.

9. A tape dispenser for dispensing in unison a plurality of individual pressure sensitive adhesive tapes comprising: means for supporting a plurality of individual rolls of pressure sensitive adhesive tape, a pair of side plates retaining said supporting means therebetween, said side plates being elongated in one direction to form a single opening at which the plurality of tapes emerge in unison and in lateral alignment when being dispensed and affixed to a surface, means causing the width of the opening through which the plurality of tapes emerge to be adjustable to substantially equal the combined width of the individual tapes, and means integral with the dispenser disposed in close proximity to said opening serving as pressure means for effecting contact between said plurality of tapes and the surface.

10. A tape dispenser for dispensing in unison a plurality of individual pressure sensitive adhesive tapes comprising: means for supporting a plurality of rolls of adhesive tape, a pair of side plates retaining said supporting means therebetween, said side plates being elongated in one direction to form a single opening at which the plurality of tapes emerge in unison and in lateral alignment when being dispensed and affixed to a surface, means causing the width of the opening through which the plurality of tapes emerge to be adjustable so as to be narrower than the combined width of the individual tapes, and pressure means integral with the dispenser disposed in close proximity to said opening for effecting contact between said plurality of tapes and the surface.

References Cited in the file of this patent

UNITED STATES PATENTS

| | | |
|---|---|---|
| 2,396,805 | Schwartz | Mar. 19, 1946 |
| 2,527,532 | Cole | Oct. 31, 1950 |
| 2,625,200 | Hirszon | Jan. 13, 1953 |
| 2,763,393 | Gill et al. | Sept. 18, 1956 |
| 2,767,931 | Woods et al. | Oct. 23, 1956 |